United States Patent [19]

Leupold

[11] Patent Number: 5,317,228
[45] Date of Patent: May 31, 1994

[54] HIGH-POWER ELECTRICAL MACHINERY WITH TOROIDAL PERMANENT MAGNETS

[75] Inventor: Herbert A. Leupold, Eatontown, N.J.

[73] Assignee: The United States of America as represented by the Secretary of the Army, Washington, D.C.

[21] Appl. No.: 21,293

[22] Filed: Feb. 22, 1993

Related U.S. Application Data

[63] Continuation-in-part of Ser. No. 650,845, Feb. 5, 1991, abandoned.

[51] Int. Cl.⁵ .................................................. H02K 31/00
[52] U.S. Cl. ........................................ 310/178; 310/154; 310/248; 310/261
[58] Field of Search ............... 310/178, 268, 102 A, 310/166, 154, 46, 177, 113, 266, 219, 261, 248, 265; 322/48

[56] References Cited

U.S. PATENT DOCUMENTS

| | | | |
|---|---|---|---|
| 3,426,224 | 2/1969 | Esters | 310/154 |
| 4,837,542 | 6/1985 | Leupold | 335/306 |
| 5,063,004 | 11/1991 | Leupold | 264/22 |
| 5,075,662 | 12/1991 | Leupold et al. | 335/306 |

OTHER PUBLICATIONS

Encyclopedic Dictionary of Electronics & Nuclear Engineering, R. I. Sarbacher, Prentice-Hall, Inc. (pp. 597-598), Englewood Clifs, N.J., 1959.
Permanent Magnets for Production & Use of High Energy Particle Beams, K. Halbach, Proceedings of the 8th Intern. Workshop on Rare Mag's & Their Applic's; Univ. of Dayton, Dayton, Ohio; 1985, (pp. 123-136).
A Catalogue of Novel Permanent-Magnet Field Soures, H. A. Leupold et al; Paper W.3.2; 9th Intern. Workshop on Rare Earth Magnets & Their Applications; Bad Soden, Frg., 1987.

*Primary Examiner*—R, Skudy
*Attorney, Agent, or Firm*—Michael Zelenka; William H. Anderson

[57] ABSTRACT

A pair of hollow permanent magnets mounted to form a toroidal stator having cylindrical gaps and opposed cavities. The magnets are polarized such that their magnetic flux passes in one direction through the gaps to intersect the rotor along two cylindrical bands and then passes through the magnetic shell and subsequently in the opposite direction through the cavities to intersect the rotor in a cylindrical region located between the cylindrical bands. An electrical circuit couples a utilization device to the rotor. Another embodiment of the invention uses a magnetic mirror to replace one of the permanent magnets. Still other embodiments teach the use of a plurality of toroidal stators mounted in tandem about a common rotor. The machine may be used as a homopolar generator or a homopolar motor.

4 Claims, 7 Drawing Sheets

HIGH-POWER ELECTRICAL MACHINERY WITH TOROIDAL PERMANENT MAGNETS

GOVERNMENT INTEREST

The invention described herein may be manufactured, used, and licensed by or for the United States Government without the payment to me of any royalties thereon.

CONTINUATION-IN-PART

The present application is a continuation-in-part of U.S. application Ser. No. 07/650,845, entitled, "HIGH-POWER ELECTRICAL MACHINERY WITH TOROIDAL PERMANENT MAGNETS," filed Feb. 5, 1991, now abandoned. Priority of the above listed U.S. Application is claimed.

BACKGROUND OF THE INVENTION

1. Field of the Invention

The present invention relates to electrical machinery and, more particularly, to homopolar, direct-current motors and generators capable of producing high output torques and high output currents, respectively.

2. Description of the Prior Art

Unipolar, homopolar, or acyclic generators and/or motors are generators/motors in which a unidirectional electromotive force is generated, thus eliminating the need for commutation as is necessary in the ordinary direct current (DC) generators/motors. The operating principles of these homopolar machines are described in such texts as *Encyclopedic Dictionary of Electronics and Nuclear Engineering*, by R. I. Sarbacher, Prentice-Hall, Inc., Englewood Cliffs, N.J. (1959), pg. 597-598. An example of such a homopolar machine, in its simplest form, is a Faraday disc generator which is merely a metal disc rotated between the poles of a magnet. Brushes are placed at the rim and center of the disc and an electromotive force is generated in the disc when either a current is applied to the disc or the disc is rotated. Of course, the efficiency of this system is greatly improved if an annular field whose axis passes through the center of the generator shaft is used. When an annular field is used, the electromotive force developed in any ring is constant so that all current paths in the disc are radially oriented. Generally, these machines generate very low electromotive forces even at high speeds and thus, the application of these machines, in their simplest form, has been limited to applications where low voltage and high current are required.

Accordingly, one of the most critical problems confronting designers of high-power electrical machinery has been simplifying their construction while not adversely effecting their ability to produce high powers. In the recent past, those concerned with designing electrical generators having high output currents and motors having high output torques have turned to the use of superconducting magnets. For example, electrical motors having superconducting magnets are currently being considered for ship propulsion where high torque outputs are critical. Although superconducting machines can serve the purpose in many situations, they are not entirely satisfactory under all conditions of service because of the considerable expense involved in manufacturing and maintaining the superconducting magnets. Such magnets normally include electromagnetic coils made of a special superconductive material that must be kept at low temperatures during machine operation. Further, the added bulk of most superconducting magnets and their power supplies makes their use undesirable in many environments, e.g. aboard ship, where space is critical. It has been recognized, therefore, that electrical motors and generators that employ superconducting magnets, while capable of producing the high magnetic fields required in high-power machines, are relatively more expensive and complicated to manufacture and maintain and more cumbersome to use than are their conventional counterparts.

Consequently, those concerned with the development of high-power electrical machinery have recognized the need for improved techniques of developing conventional-type electrical machinery capable of high-power operation while not being unduly complicated and expensive to manufacture and maintain. The present invention fulfills this need.

SUMMARY OF THE INVENTION

Accordingly, the general purpose of this invention is to provide an electrical machine capable of high-power outputs which embraces all the advantages of similarly employed machines, superconducting or otherwise, and possesses none of the aforedescribed disadvantages. To obtain this, the present invention contemplates a unique stator and rotor arrangement wherein a significant portion of the working magnetic field is coupled to the current-carrying conductors. More specifically, one embodiment of the invention comprises a pair of hollow permanent magnets mounted to form a toroidal stator having cylindrical gaps and opposed cavities. The magnets are magnetized such that a portion of the magnetic flux passes in one direction through the gaps to intersect through the rotor. The magnetic flux which passes through the working cavity of the toroidal magnetic structure is directed in the opposite direction to intersect the rotor. Depending on the application, brushes or a slip ring conduct (or apply) electrical current from (or to) the cylindrical rotor. In a preferred embodiment of the invention, the rotor has a lamination or means to alternate the conductivity of the rotor from a nonconducting state to a conducting state. This can be achieved simply by making the rotor a composite of alternating nonconducting and conducting materials.

Another embodiment of the invention uses a magnetic mirror to replace one of the permanent magnets. Still other embodiments teach the use of a plurality of toroidal stators mounted in tandem about a common rotor.

BRIEF DESCRIPTION OF THE DRAWINGS

The exact nature of this invention, as well as other objects and advantages thereof, will be readily apparent from consideration of the following specification and annexed drawings wherein like numerals refer to identical elements of the invention.

DETAILED DESCRIPTION OF THE PREFERRED EMBODIMENTS

Figure 1:
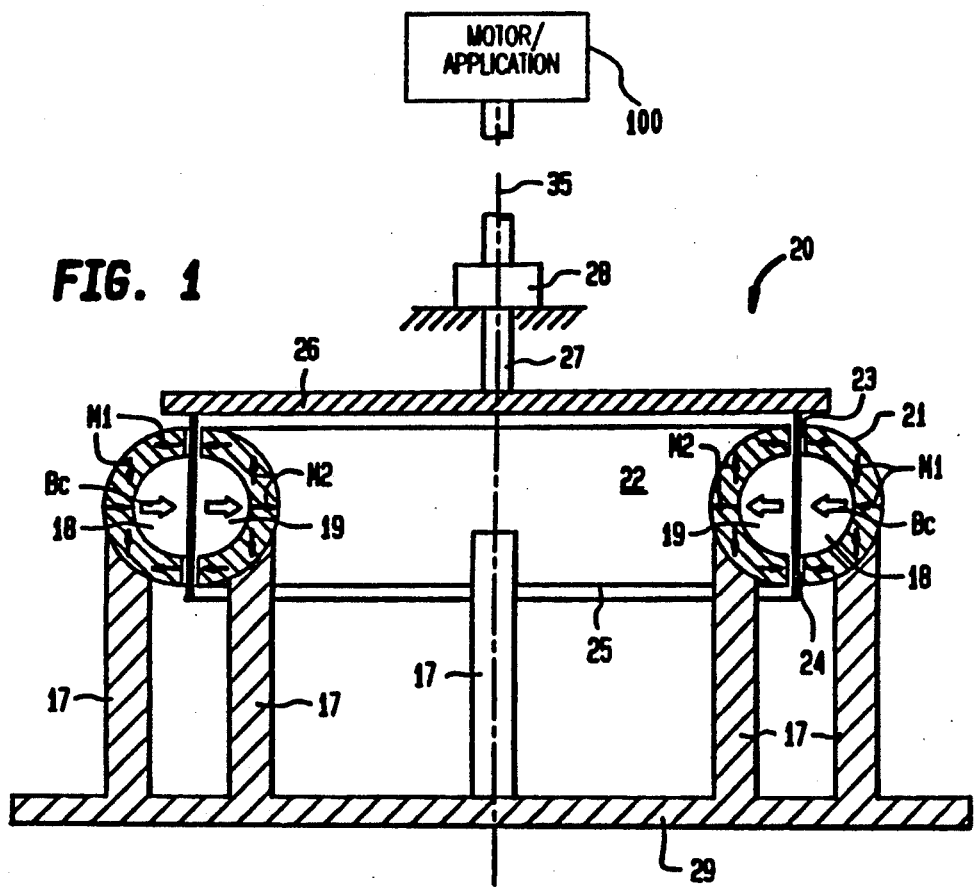
FIG. 1 is an elevation in cross section illustration of the preferred embodiment.

Referring now to the drawings, there is shown in FIG. 1 an electrical machine 20 having permanent magnets in the form of hollow shells 21, 22 that together define a toroidal stator with opposed cavities 18, 19. The shells 21, 22 are spaced to form cylindrical gaps 23, 24. A cylindrical rotor 25, made of non-magnetic, partially conductive material such as copper interspersed with a nonconductive material or lamination, is mounted for rotation in gaps 23, 24. A mounting plate 26, fixed to rotor 25, is rotatably supported by a shaft 27 that rotates in a fixed bearing 28. The shells 21, 22 are supported on a base 29 by upright columns 17. The shells 21, 22, rotor 23, and associated structures are shown in section in FIG. 1 to illustrate only one half of the machine 20, there being an identical second half to form a structure that is symmetrically disposed about a central axis 35.

The machine 20 may be employed as a homopolar motor or a homopolar generator depending on whether the rotor 25 is energized by electrical currents from an outside current source (shown in FIG. 2) or the shaft 27 is rotated by an outside mechanical energy source (such as by motor 100). In either case, an electrical circuit is coupled to the rotor 25 in a circuit configuration such as that shown in FIG. 2.

Figure 2:
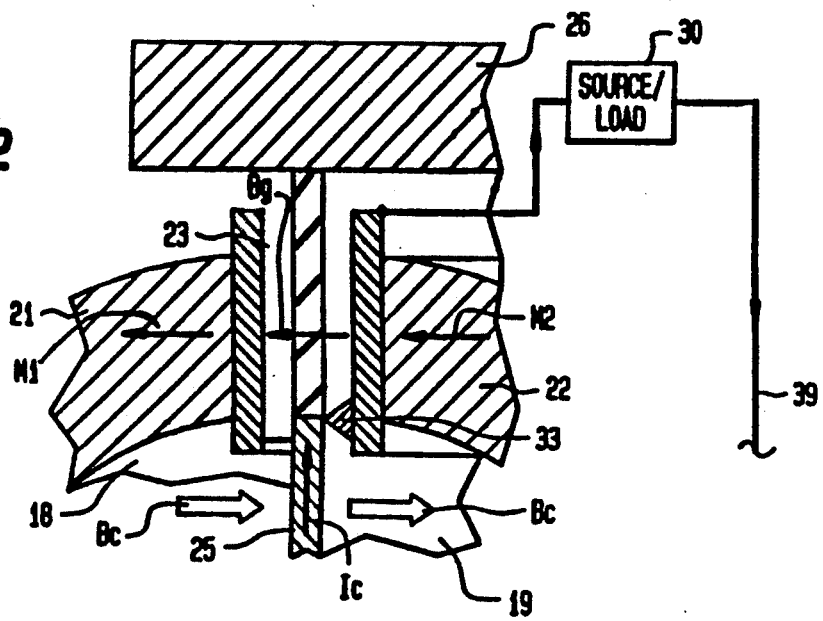
FIG. 2 is a cross section illustrating a detail of the preferred embodiment shown in FIG. 1.

FIG. 2 diagrammatically illustrates a preferred electrical circuit. A utilization device in the form of a direct current source/load 30 is connected on one side to a brush 33 and on the opposite bottom end of the cylinder to a brush (not shown). The brushes 33 may each be a circular ring that makes contact with the rotor 25 along a continuous, cylindrical band at the locations indicated, or they may each be constructed as a plurality of segments connected in common and spaced along the cylindrical band. Brushes 33 may also include non-magnetic, conductive cylindrical plates that are fixed to the cylindrical faces of shells 21, 22, respectively, in the gap 23. Such a brush arrangement may also be referred to as a slip ring element and as those skilled in the art will appreciate, these two types of contact means may be used interchangeably. Similar brushes (not shown) contact the rotor 25 on either side of gap 24 and are connected to source/load 30 via conductor 39 (FIG. 2).

Figure 11:
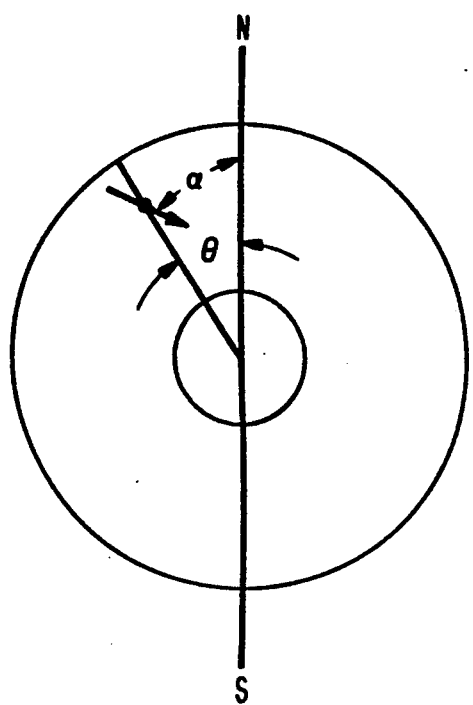
FIG. 11 is a geometric diagram illustrating one aspect of the present invention.

The magnetization of the shells 21, 22 are indicated by the arrows of magnetizations M1, M2 respectively (FIGS. 1, 2). The magnetizations M1, M2 adjacent the gaps 23, 24 and in a central, horizontal plane midway between the gaps 23, 24 are oriented radially with respect to axis 35. Between these positions, the orientation ($\alpha$) of the magnetizations M1, M2 varies gradually in the cross section of the toroidal structure by the equation:

$$\alpha = 2\theta$$

where $\theta$ is an axial angle. These values ($\alpha$ and $\theta$) are shown in the geometric illustration of FIG. 11. The value $\alpha$ is a magnetization angle with respect to an axis. A method of fabricating such a structure is taught in U.S. Pat. No. 5,063,004, entitled, "Fabrication of Permanent Magnet Toroidal Rings," issued to the inventor herein on Nov. 5, 1991. This patent is incorporated herein by reference. One can determine the field at the center (or working cavity) of such a configuration by finding the pole densities in the annular shell and on its inner and outer surfaces, inserting those values into Coulomb's equation and integrating over the volume and surfaces of the shells. This calculation is shown in U.S. Pat. No. 4,837,542, entitled, "Hollow Substantially Hemispherical Permanent Magnet High-Field Flux Source For Producing A Uniform High Field," issued to the inventor herein on Jun. 6, 1989, also incorporated herein by reference. (Of course, this patent makes this calculation for a spherical structure. However, for purposes of the present application the field is only reduced by a factor of 4/3.) Utilizing such a structure for the present invention, working magnetic fields of, at least, 13 kOe can be obtained. In the ideal case, the magnetic field Bc in the working cavities 18, 19 will primarily be perpendicular to the surface of rotor 25, pointing either radially inward or radially outward. For the orientation illustrated in FIGS. 1, 2, the field Bc points radially inward. Of course using the equation given above, the field in the gaps 23, 24 will also be perpendicular to the surface of rotor 25, pointing radially in the direction opposite to that of field Bg. For the orientation illustrated in FIGS. 1, 2, the field Bg points radially outwardly.

Magnetizing the toroid structure in accordance with the equation given above and as depicted by the arrows in FIG. 1, the magnetization M1 of shell 21 will be antisymmetric with respect to the magnetization M2 of the shell 22. The magnetizations M1, M2 are antisymmetric in the sense that their shell orientations are reversed for the corresponding locations in the shells 21, 22. For example, in shell 22 the magnetization M2 near the gaps 23, 24 points out of the shell 22 toward the gaps 23, 24. By contrast, the magnetization M1 near the gaps 23, 24 points into the shell 21 away from the gaps 23, 24. The magnetic shells 21, 22 are preferably fabricated from conventional magnetic materials such as alloys of alnico or cobalt and neodymium.

Figure 9:
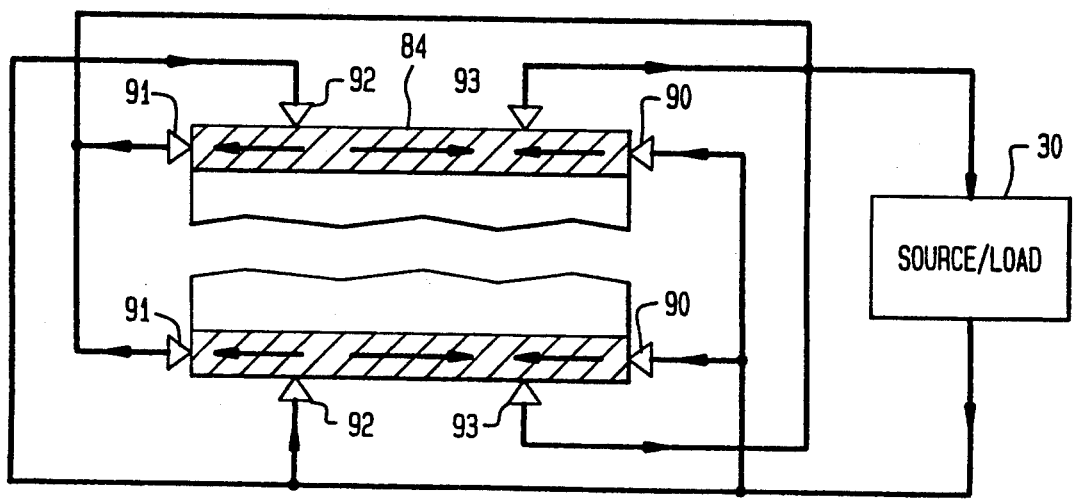
FIG. 9 is a schematic circuit diagram illustrating current flow for the embodiment shown in FIG. 8.

Another permanent magnet structure which may also be utilized in the present invention is illustrated in FIG. 9. For a more detailed description of this structure and a cladding technique to enhance the magnetic field see U.S. Pat. No. 5,075,662, entitled "Enhanced Magnetic Field Within Enclosed Annular Cavity," issued to Leopold et al on Dec. 24, 1991, incorporated herein by reference.

Further, the magnetic shells 21, 22 may also be constructed in accordance with the principles disclosed in the article entitled, "Permanent Magnets for Production and Use of High Energy Particle Beams," by Klaus Halbach, *Proceedings of the Eighth International Workshop on Rare Cobalt Permanent Magnets*, (Univ. Of Dayton, Dayton, Ohio 1985) pp. 123-136; and the paper entitled, "A Catalogue of Novel Permanent-Magnet Field Sources," by H. A. Leopold et al, Paper No. W3.2 at the *9th International Workshop on Rare-Earth Magnets and Their Applications*, Bad Soden, FRG, 1987, all of which are incorporated herein by reference.

In operation, the machine 20 may be used as a homopolar motor or a homopolar generator. When used as an electric generator, a torque is applied to the shaft 27 by motor 100 (or other mechanical energy means such as a hydrodynamic system) to cause the rotor 25 to rotate. The field Bc will interact with the rotor 25 and induce a current, labelled Ic, in rotor 25. More specifically, assuming that an outside force (motor 100 or other means) rotates the rotor 25 clockwise as viewed from above in FIG. 1, longitudinal currents Ic will be induced in the rotor 25 and flow upwardly in the directions indicated by the arrows in FIG. 2. It is noted that the brushes 33 (FIGS. 2 and 3) are located at the boundary where the conductive portion of the rotor becomes nonconductive or stops. The induced gap current in the cavity Ic will flow from the rotor 25 into the load (source/load 30) via the brushes 32, 33. The current will return to rotor 25 from source/load 30 via brushes at the bottom end of the cylinder and conductor 39.

The machine 20 may also be used as a homopolar motor. When the machine 20 is used as a motor, a current source (load/source 30) applies the currents Ic to the rotor 25 via the brushes (not shown in FIG. 2, but see FIG. 3) located near the bottom of the rotor. The applied currents Ic will induce an electric field which will, in turn, interact with the field Bc and produce forces on rotor 25 so as to cause the rotor to rotate about axis 35. For the orientation of the fields Bc and the currents Ic as shown in FIGS. 1, 2, the rotor 25 will be rotated clockwise as viewed from above in FIG. 1.

Figure 3:
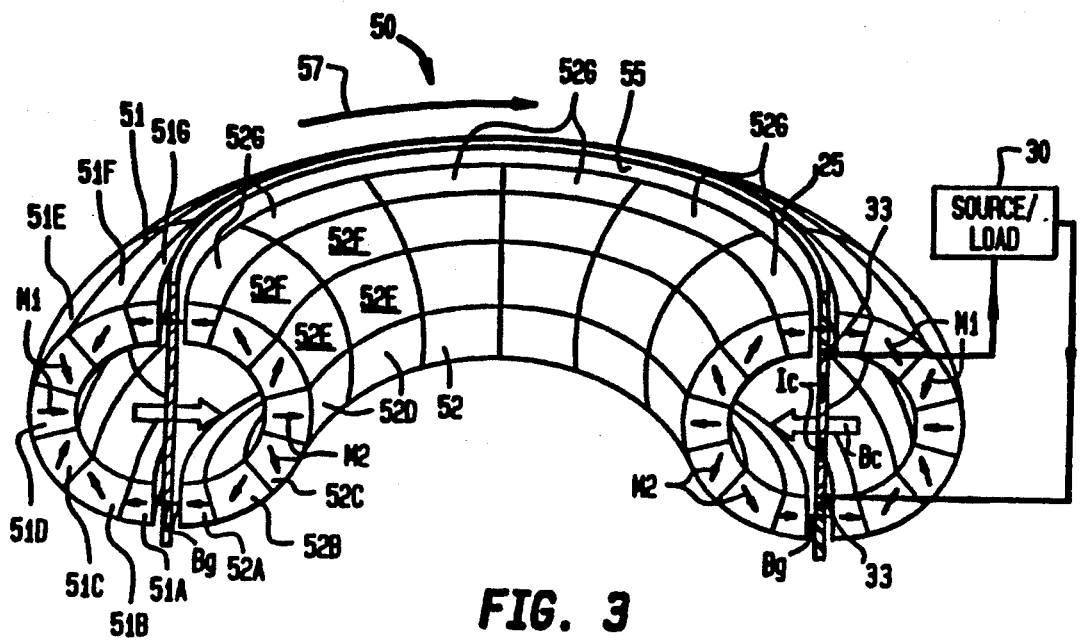
FIG. 3 is a pictorial view of one half of the preferred embodiment shown in FIG. 1.

It is noted that the magnetic shells 21, 22 represent an ideal structure wherein the direction of the magnetizations M1, M2 gradually and continuously varies throughout the shells 21, 22. With present technology, such a structure would be difficult to achieve. A good approximation of the ideal structure is readily realized by using small magnetic segments each of which is uniformly magnetized. FIG. 3 illustrates one example of a segmented toroidal structure.

The machine 50 of FIG. 3 includes spaced magnetic shells 51, 52 and a cylindrical conductor 55 mounted in cylindrical gaps formed between shells 51, 52. The shells 51, 52 are formed from a plurality of segments 51A–51G and 52A–52G, each of which is uniformly magnetized in the directions illustrated by arrows M1, M2. The segments 51A–52A-are arranged in circular rows with the segments in each row being identical. For example, the segments 52G, which form the top, are each shaped identically and magnetized uniformly in the same direction with respect to the body of the segment 52G. For the embodiment shown in FIG. 3, twelve segments 52G (only six are illustrated) are arranged in a closed loop to form the top circular row of shell 52. The shell 52 includes a total of seven circular rows of segments 52A–52G each of which includes twelve segments. The resultant external magnetic fields produced by shells 51, 52 will be primarily confined to the gaps and cavities. The fields are depicted as the gap field Bg and the cavity field Bc.

FIG. 3 also illustrates the situation wherein the shells 51, 52 are rotated while the conductive cylinder 55 is held stationary. The source/load 30 is connected directly to the cylinder 55 at the points indicated without the need for brushes. One side of source/load 30 is connected to the cylinder 55 adjacent to the top of each gap while the other side is connected to cylinder 55 adjacent to the bottom of each gap. Assuming that the shells 51, 52 are rotated externally in the direction shown by arrow 57, machine 50 will perform as a homopolar generator inducing current Ic in the cylinder 55 in the directions indicated. Likewise, if direct current Ic is applied to the cylinder 55 by the source (source/load 30), the machine 50 will act as a homopolar motor and a torque will be applied to the shells 51, 52 that will cause them to move as a unit in the direction of arrow 57.

Figure 10:
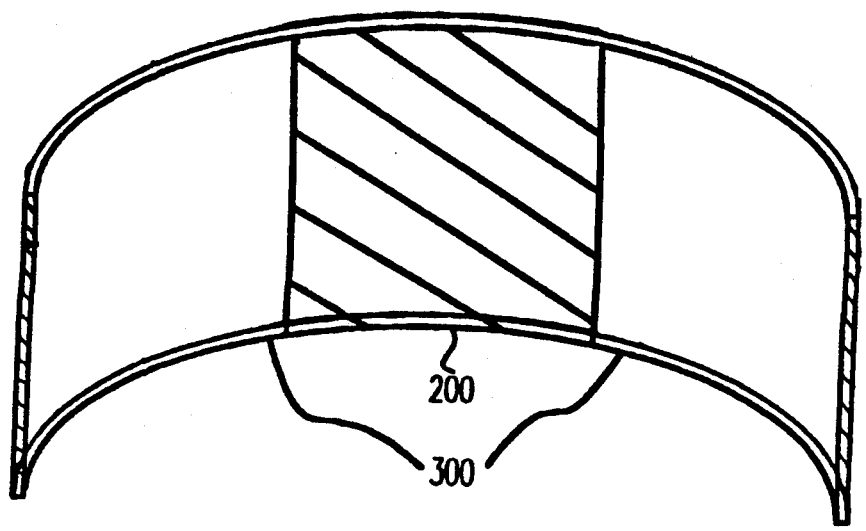
FIG. 10 is a partial view of the preferred rotor utilized in the present invention.

FIG. 10 is a partial illustration of the preferred rotor utilized in a motor according to the present invention. As shown, the center of the rotor is sectioned into conductive portions 300 and nonconductive portions 200. Moreover, the rotor, for the configuration in FIGS. 1–3, is constructed such that the portions of the rotor which pass through the gaps of the toroidal structure are nonconductive or are laminated. The rotor is sectioned in this manner to provide for distinct electric fields when a current Ic is applied by the brushes 33. As will be appreciated by those skilled in the art the sectioning of the rotor in this manner will act as separate windings along the circumference of the rotor.

It is also noted that the machine 20 of FIGS. 1, 2, and 3 may be modified to cause the rotor 25 to remain fixed while rotating the shells 21, 22. One advantage of this modification would be the substitution of simple contacts for the brushes 33. However, in many applications, the mass of the magnetic shells 21, 22 would be much greater than that of the rotor 25, making it more practical to hold the shells 21, 22 stationary while rotating the rotor 25 as illustrated in FIGS. 1, 2.

Figure 4:
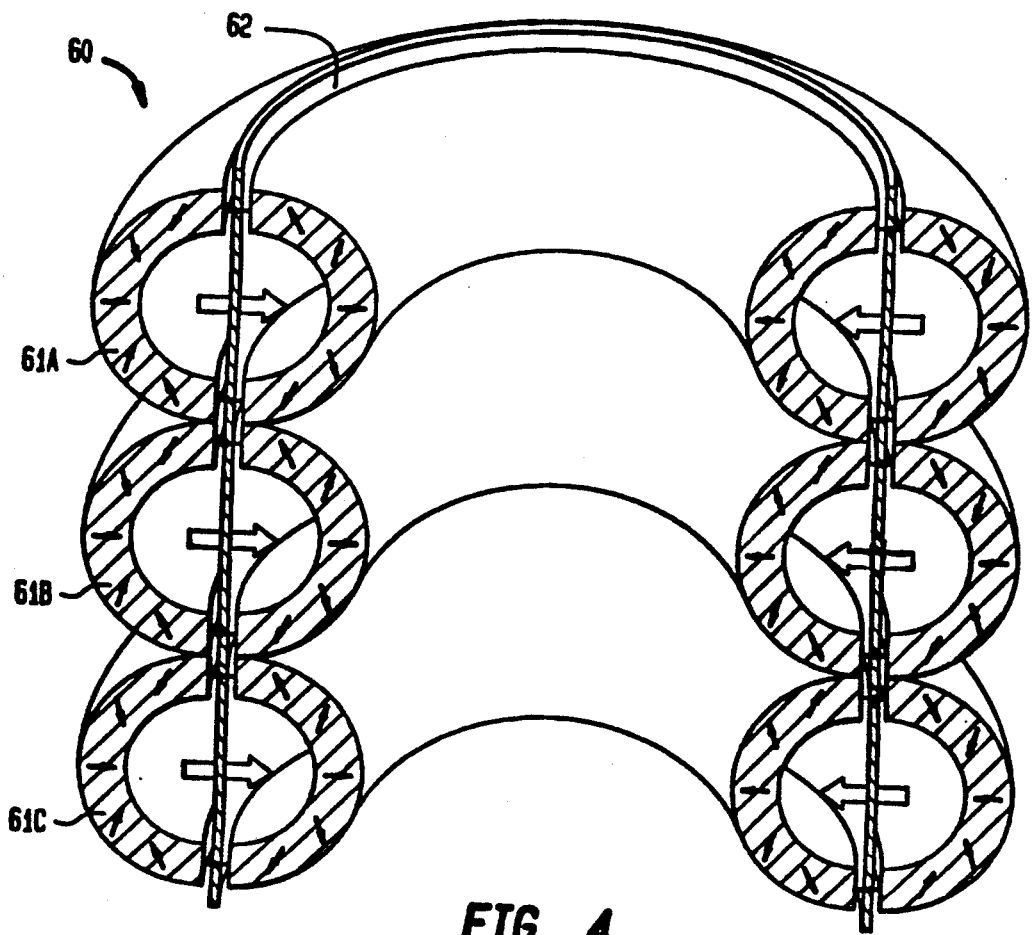
FIG. 4 is a pictorial view in cross section of alternate embodiment of the present invention.

FIG. 4 illustrates a ganged system 60 constructed from a plurality of identical hollow, toroidal magnets 61A, 61B, 61C, mounted in tandem. The magnets 61A–61C are mounted coaxially and have superimposed cylindrical gaps. A conductive cylinder 62 is mounted in the gaps. The magnets 61A–61C and the cylinder 62 are mounted for relative rotation with respect to each other, either the magnets 61A–61C or the cylinder 62 may be held stationary. Any number of such magnets 61A–61C may be ganged about the common cylinder 62 to increase the power.

Figure 5:
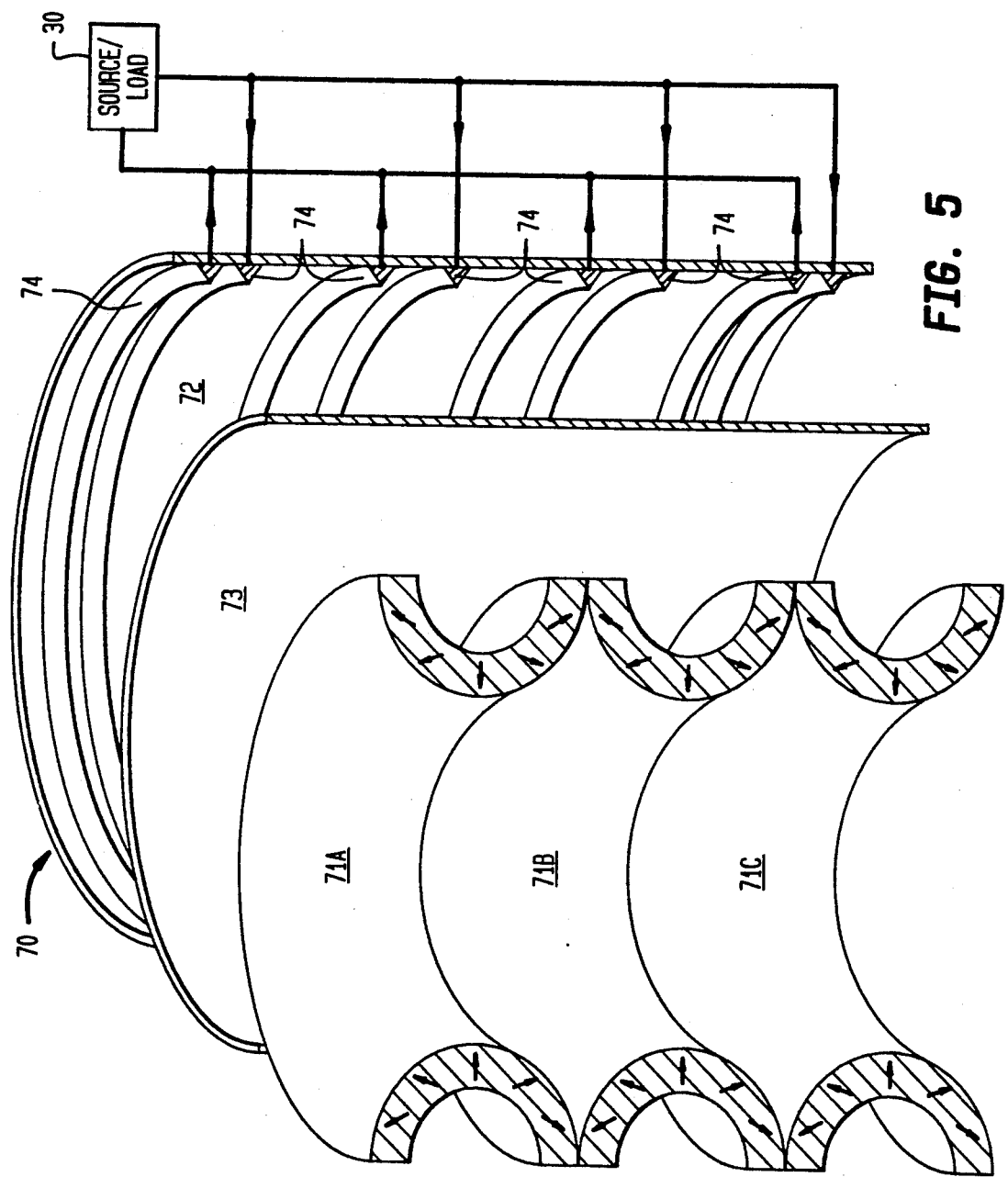
FIG. 5 is an exploded pictorial view in cross section of the alternate embodiment shown in FIG. 4 with the appropriate electrical circuitry.
Figure 6:
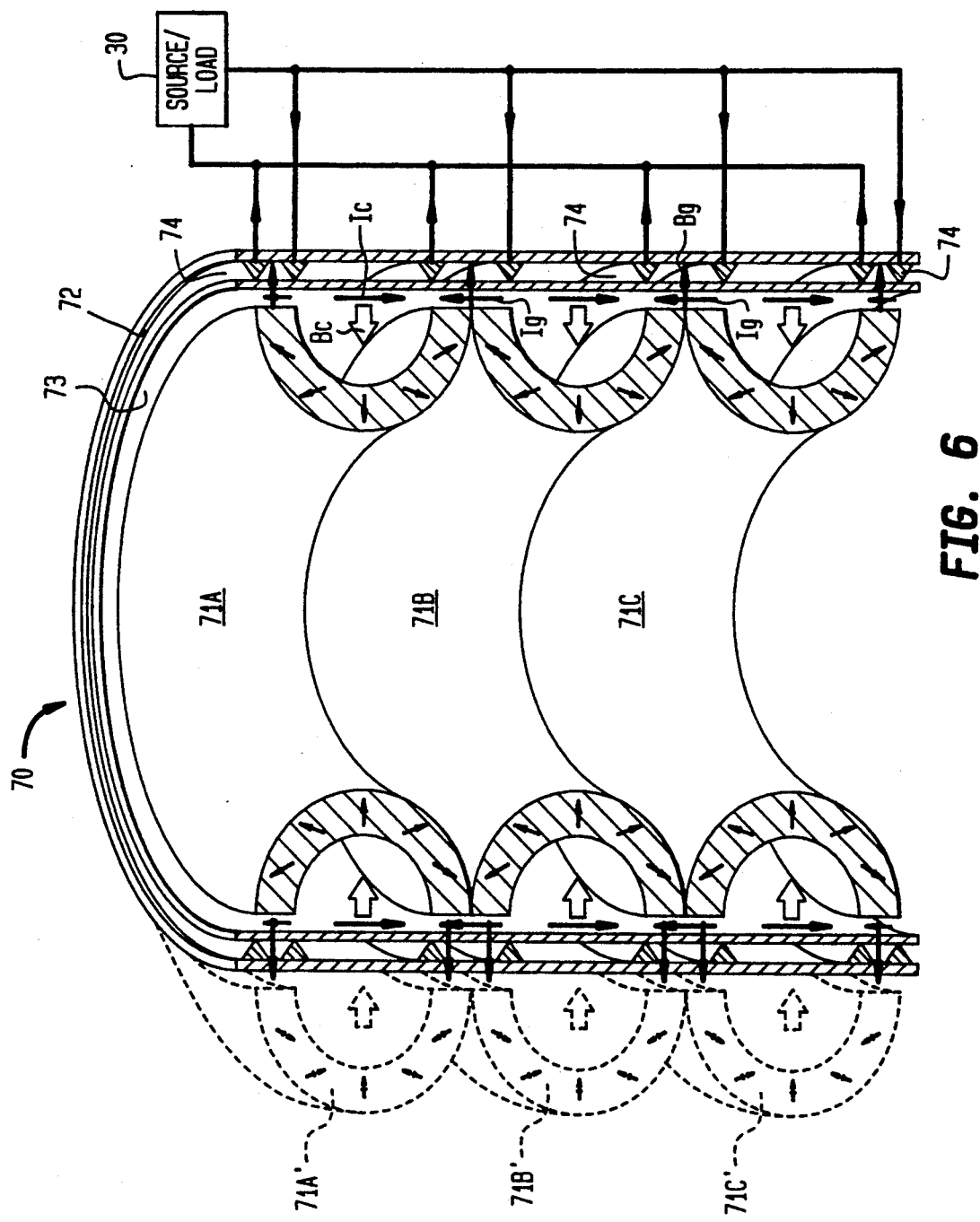
FIG. 6 is a pictorial view in cross section of the device shown in FIG. 5 illustrating the utilization of a magnetic mirror.

FIGS. 5 and 6 illustrate a ganged system 70 having three toroidal magnets 71A, 71B, 71C mounted coaxially. The magnets 71A–71C are of essentially identical size and magnetization. A magnetic mirror 72, formed from a cylinder of magnetic material such as iron is mounted coaxially with respect to the magnets 71A–71C. The magnets 71A–71C are spaced from mirror 72 to form a series of superimposed cylindrical gaps in which a conductive rotor 73 is mounted for rotation with respect to the magnets 71A–71C. A plurality of ring-shaped conductive brushes 74 are mounted on the mirror 72 so as to contact the rotor 73 at those points where the currents reverse or change direction due to the reversal in the magnetization at the rims of the permanent magnet. Thus, this reversal of the magnetization is utilized by placing these conductive brushes where the currents will be opposed. The brushes 74 would be insulated from the mirror 72 when it is formed from an electrically conductive material such as iron.

The mirror 72, sometimes called an anti-mirror, will provide a path for the fields Bc and Bg such that the magnets 71A–71C will see anti-images 71AI–71CI as illustrated on the left side of FIG. 6. The anti-image 71AI–71CI will, of course, extend completely around the machine 70. The anti-images 71AI–71C' will appear to have magnetizations that are antisymmetric to the magnetizations of shells 71A–71C.

The machine 70 is an example of the use of magnetic mirrors to reduce the size and weight of a machine by eliminating the need for a second opposing shell as shown in the previous embodiments. Also, because of the mirror 72, the machine 70 may use shells of only one type of shape, size and magnetization. As such, the cost of manufacturing toroidal-type machines may be reduced significantly by using magnetic mirrors. However, it is noted that a magnetic mirror, such as mirror 72, in some applications may be a limiting factor. The amount of power output from machine 70, for example, will depend on the amount of magnetic flux that the mirror 72 is capable of conducting. Mirror 72 may become saturated at a relatively low level thereby adversely limiting the amount of flux and power output.

It is noted further that in the embodiment of FIGS. 5 and 6, the magnets 71A–71C may be made to rotate while holding the cylindrical rotor 73 stationary. If the mirror 72 is made of a conductive material such as iron, it would usually be preferred to have the mirror 72 rotate with the magnets 71A–71C to prevent eddy currents from being generated in the mirror 72. However, the magnetic mirror 72 may also be fabricated from an electrically insulating material, in which case the mirror 72 may be stationary as the magnets 71A–71C rotate. Simple stationary contacts may be substituted for the brushes 74 in those situations where the cylindrical rotor 73 is held stationary and the magnets 71A–71C rotate.

Figure 7:
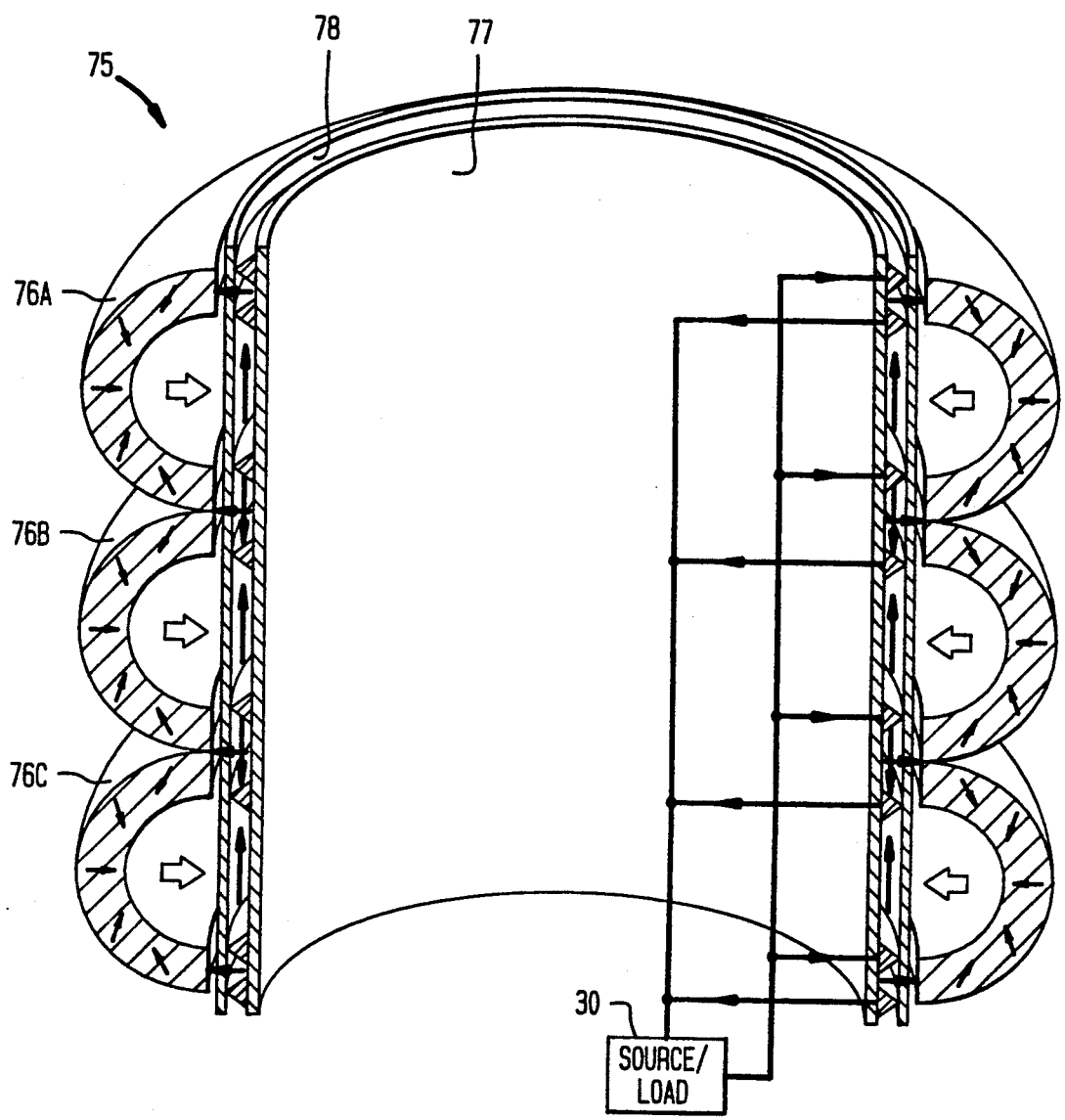
FIG. 7 is a similar embodiment as that illustrated in FIG. 6, but this illustration shows another configuration for magnetic mirror.

FIG. 7 illustrates a machine 75 that is an inside-out version of the machine 70. The machine 75 has ganged toroidal shells 76A, 76B, 76C mounted in tandem coaxially with respect to a cylindrical magnetic mirror 77. A conductive rotor 78 is mounted for rotation in the superimposed cylindrical gaps formed between the shells 76A–76C and the mirror 77. The rotor 77 is electrically connected to a source/load 30 via brushes. The machine 75 is in essence a mirror image of the machine 70 (FIGS. 5, 6). Those skilled in these arts will find it readily obvious to nest a machine 70 inside the mirror 77 of a machine 75. For example, machine 70, which has shells 71A–71C mounted inside mirror 72 could be readily mounted inside the mirror 77 of a machine 75, which has exterior shells 76A–76C. The rotors 73, 78 from the nested machines 70, 75 may be fixed on a common output shaft for rotation with respect to fixed mirrors 72, 77 and fixed shells 71A–71C and 76A–76C. If one does this, one will just have the equivalent of machine 20 (FIG. 1) with a redundant iron mirror. If, however machines 70 and 75 are arranged so that their fields point in opposite directions, their rotors 73, 78 could be connected at their ends to form a circuit with effectively two generators in series with double the field generated from a structure with the length of only one generator.

Figure 8:
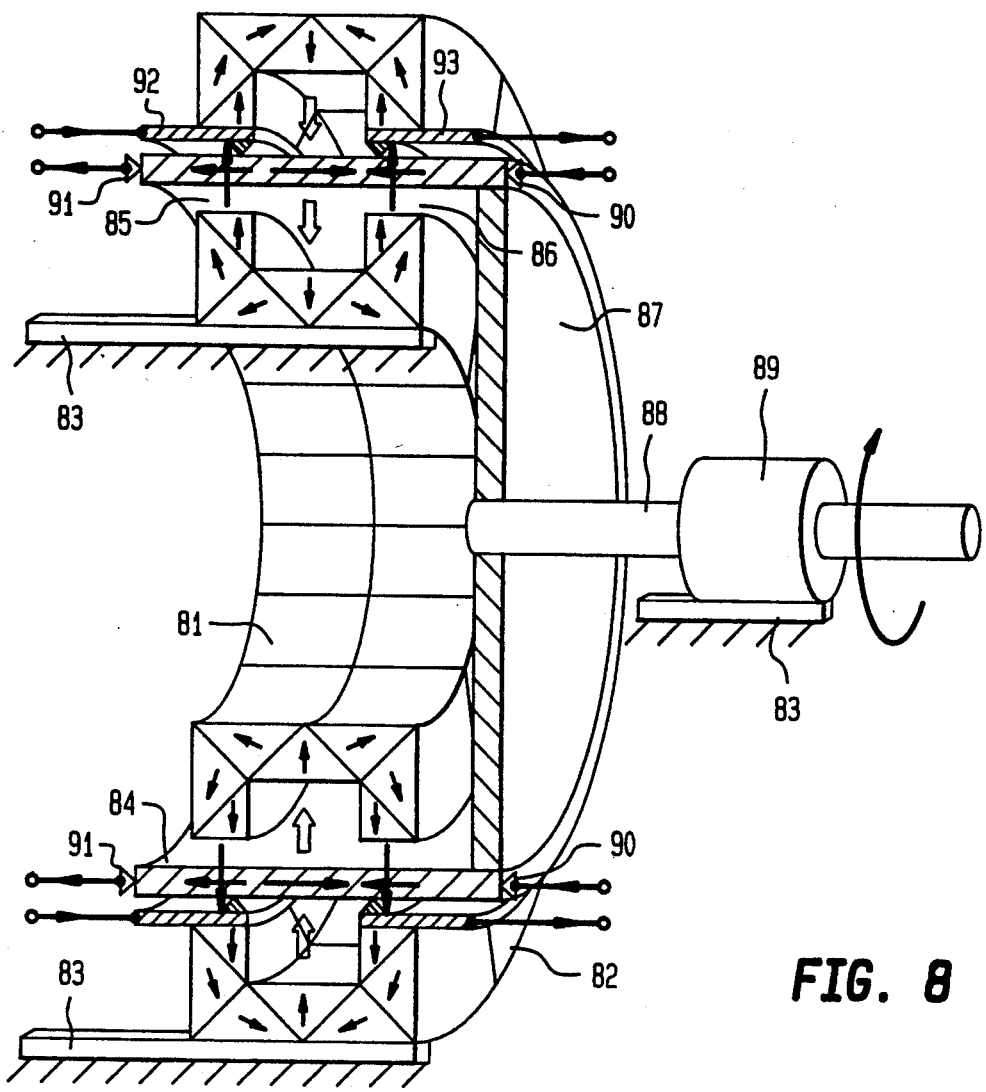
FIG. 8 is a pictorial view in cross section of another alternate embodiment of the invention.

It is noted that the fabrication of toroidal magnets having circular or semicircular cross sections may be more expensive than fabricating toroidal magnets of other shapes. FIG. 8 illustrates a machine 80 composed of rectangular toroidal magnetic shells 81, 82 fixed to support 83. A cylindrical rotor 84 is mounted for rotation in the cylindrical gaps 85, 86 via the mounting plate 87, the shaft 88 and fixed bearing 89.

The shells 81, 82 are each made up of short segments each of which is uniformly magnetized. Each segment has a triangular cross section that permits them to be nested together to form a rectangular, U-shaped, toroidal configuration. Each shell 81, 82 is composed of seven different types of segments arranged in twelve (only six are illustrated) sections.

FIG. 9 illustrates an electrical circuit for connecting load/source 30 to the rotor 84 via brushes 90–93. Brushes 90, 93 are connected to rotor 84 on either side of gap 86. Brushes 91, 92 are connected to either side of gap 85. Brushes 92, 93 are connected to either side of the cavities formed by the hollow shells 21, 22.

Various modifications and alternations are contemplated and may obviously be resorted to by those skilled in the art in the light of the above teachings. It is therefore to be understood that, within the scope of the appended claims, the invention may be practiced otherwise than as specifically described.

What is claimed is:

1. A homopolar motor comprising:
   a permanent magnet structure having two magnet shells, the permanent magnet structure having a hollow central cavity such that when the magnet shells are placed together the permanent magnet structure is a hollow toroid having a circular gap between the two magnet shells, said magnet shells being magnetized such that an orientation of their magnetization $\alpha$ varies over the cross section of said shells by the equation: $\alpha = 2\theta$, where $\theta$ is an axial angle, such that a radial transverse magnetic field is generated in said hollow central cavity;
   an electrically conductive cylinder rotatably and coaxially mounted with respect to said magnet shells within said circular gap and lying in said transverse magnetic field;
   an electrical source; and
   conductive brushes connecting the electrical source to the conductive cylinder.

2. The motor of claim 1 wherein the conductive cylinder is only partially conductive.

3. The motor of claim 2 wherein said brushes are sliding contacts.

4. The motor of claim 2 wherein said electrical source is a direct current source.

* * * * *